United States Patent
Patel et al.

(10) Patent No.: US 11,115,385 B1
(45) Date of Patent: Sep. 7, 2021

(54) SELECTIVE OFFLOADING OF PACKET FLOWS WITH FLOW STATE MANAGEMENT

(71) Applicant: Cisco Technology, Inc., San Jose, CA (US)

(72) Inventors: Pradeep Patel, Fremont, CA (US); Jonathan A. Kunder, San Jose, CA (US); Ashish K. Dey, Sunnyvale, CA (US); Andrew E. Ossipov, Lewisville, TX (US); Jianxin Wang, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 419 days.

(21) Appl. No.: 15/220,697

(22) Filed: Jul. 27, 2016

(51) Int. Cl.
| | |
|---|---|
| *G06F 15/16* | (2006.01) |
| *H04L 29/06* | (2006.01) |
| *H04L 12/851* | (2013.01) |
| *G06F 16/901* | (2019.01) |

(52) U.S. Cl.
CPC ...... *H04L 63/0245* (2013.01); *G06F 16/9017* (2019.01); *H04L 47/2441* (2013.01); *H04L 63/1425* (2013.01)

(58) Field of Classification Search
CPC ... H04L 47/2441; H04L 47/10; H04L 47/193; H04L 63/0245; H04L 63/1425
See application file for complete search history.

(56) References Cited

U.S. PATENT DOCUMENTS

| | | | |
|---|---|---|---|
| 7,536,715 B2 | 5/2009 | Markham | |
| 7,546,635 B1* | 6/2009 | Krohn | .............. H04L 63/0254 370/351 |
| 8,462,780 B2 | 6/2013 | Vincent et al. | |
| 8,789,135 B1* | 7/2014 | Pani | .............. H04L 47/125 726/1 |
| 8,955,107 B2 | 2/2015 | Eyada | |
| 9,240,975 B2 | 1/2016 | Roberson | |
| 9,286,472 B2* | 3/2016 | Dalal et al. | .............. H04L 47/10 |
| 2002/0016826 A1* | 2/2002 | Johansson et al. | .............. G06F 15/16 709/245 |
| 2005/0182968 A1* | 8/2005 | Izatt et al. | .............. H04L 9/00 713/201 |

(Continued)

*Primary Examiner* — Suraj M Joshi
*Assistant Examiner* — Ayele F Woldemariam
(74) *Attorney, Agent, or Firm* — Edell, Shapiro & Finnan, LLC

(57) ABSTRACT

A first packet of a packet flow is received at a classifying network device. The first packet is forwarded from the classifying network device to a firewall network device. An indication that the packet flow is to be offloaded is received at the classifying network device. Data is stored at the classifying network device indicating that the packet flow is to be offloaded. A non-control packet of the packet flow is received at the classifying network device. A determination is made that the non-control packet belongs to the packet flow by comparing data contained in the non-control packet to the stored data. The non-control packet of the packet flow is directed to a processing entity in response to the determining. A control packet of the packet flow is received at the classifying network device. The control packet of the packet flow is directed to the firewall network device.

23 Claims, 7 Drawing Sheets

(56) References Cited

U.S. PATENT DOCUMENTS

| | | | |
|---|---|---|---|
| 2008/0271134 A1* | 10/2008 | Johnson | H04L 63/02 726/13 |
| 2010/0180342 A1* | 7/2010 | An | H04L 12/56 726/22 |
| 2010/0242093 A1* | 10/2010 | Zuk et al. | G06F 21/00 726/3 |
| 2012/0250686 A1* | 10/2012 | Vincent et al. | H04L 12/56 370/392 |
| 2014/0086211 A1* | 3/2014 | Liu | H04L 45/38 370/331 |
| 2014/0325636 A1* | 10/2014 | Mihelich | H04L 63/0218 726/14 |
| 2015/0019702 A1 | 1/2015 | Kancherla | |

* cited by examiner

US 11,115,385 B1

SELECTIVE OFFLOADING OF PACKET FLOWS WITH FLOW STATE MANAGEMENT

TECHNICAL FIELD

The present disclosure relates to network security devices.

BACKGROUND

High throughput or "fat" flows are generally processed at firewall devices along with other non-"fat" flows. Accordingly, the high throughput flows are hashed to any of the ingress queues of the firewall device without consideration of the high throughput nature of the flows. The processing of the high throughput flows may negatively affect the processing of traffic of other flows which have been hashed to the same queue. When firewalls handle high throughput flows, packets of other flows on the same queue may be dropped due to the performance demands of the high throughput flow. Furthermore, as packets in a queue are handled serially, some flows may require more processing if enhanced inspections are enabled on such packets, while other flows maybe processed with minimal processing, resulting in jitter in flow latency.

It may also be desirable to avoid deep packet inspection of flows that require low latency (e.g., real-time financial trading application flows) or flows with a low likelihood of being malicious (e.g., trusted back-up flows) that do not require deep packet inspection. For both high throughput flows and other flows for which low-latency is beneficial and/or deep packet inspection may not be necessary, the ability to increase flow throughput while maintaining some visibility at a network security device may be useful.

DESCRIPTION OF EXAMPLE EMBODIMENTS

Overview

In one embodiment, a first packet of a packet flow is received at a classifying network device. The first packet is forwarded from the classifying network device to a firewall network device. An indication that the packet flow is to be offloaded is received at the classifying network device from the firewall network device. Data is stored at the classifying network device that indicates that the packet flow is to be offloaded. A non-control packet of the packet flow is received at the classifying network device. A determination is made that the non-control packet belongs to the packet flow by comparing data contained in the non-control packet to the data stored at classifying network device. The non-control packet of the packet flow is directed to a processing entity in response to the determining. A control packet of the packet flow is received at the classifying network device. The control packet of the packet flow is directed to the firewall network device.

Example Embodiments

Figure 1:
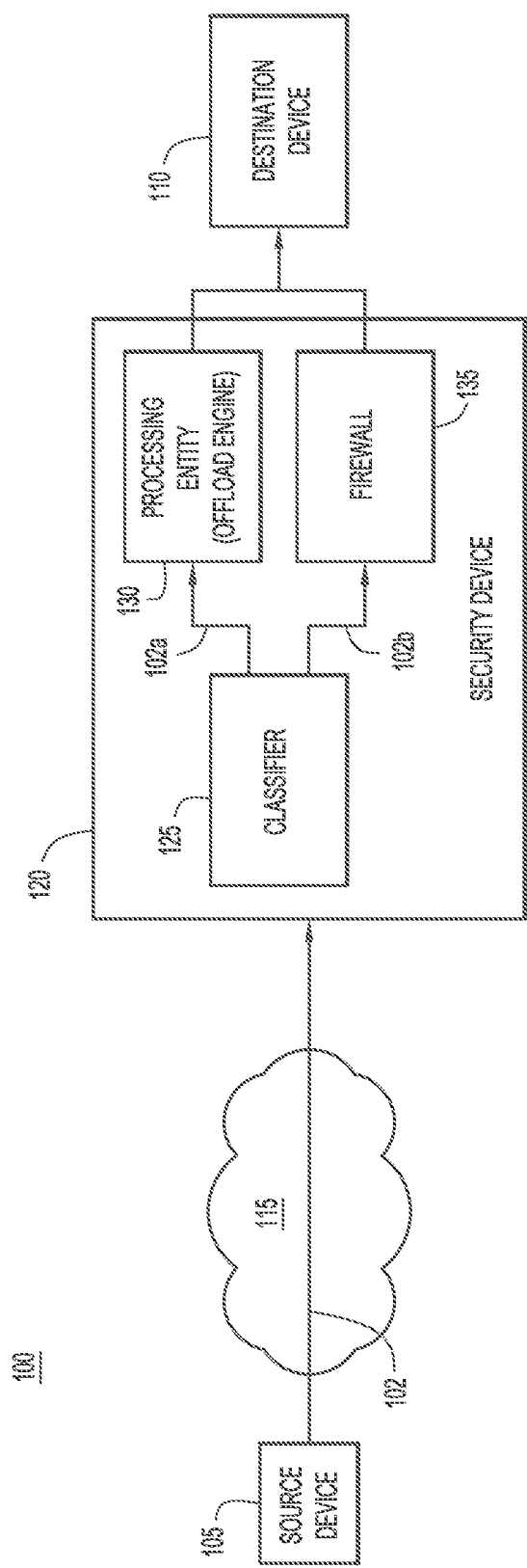
FIG. 1 illustrates a network environment configured to perform selective offloading of packet flows with flow state management, according to an example embodiment.

With reference now made to FIG. 1, depicted therein is a network environment 100 configured to perform selective packet flow offloading with state management via a security device. As illustrated in FIG. 1, a packet flow 102 is being sent from source device 105 to destination device 110 via network 115. For example, device 105 and device 110 may be members of a data center with device 105 serving as a storage network device for the data center and device 110 serving as a compute network device for the data center. In such an implementation, packet flow 102 may be a "fat" packet flow, meaning packet flow 102 is a high throughput packet flow. Packet flow 102 may also be a flow that requires low latency, such as a packet flow for a real-time financial trading application, or a trusted flow that does not require deep packet inspection, such as a trusted back-up flow. The packet flow is received at security device 120 where it is evaluated by a classifier function 125 of the security device 120. Thus, the security device 120 has several functions/entities, including classifier function 125, processing entity 130 (also referred to as an "offload engine") and firewall 135. According to conventional techniques, a decision will be made to process the flow at a firewall function 135 of the security device or offload the flow to a processing entity 130. Processing entity 130 implements simple policies on packet flow 102, such as Internet Protocol (IP) address Transport Control Protocol (TCP) port rewrites, based upon, for example, hardware instructions. Accordingly, processing entity 130 serves as an offload engine for packet flow 102. When offloaded to offload engine 130, full security policies may not be applied to the flow, and complete flow state information for packet flow 102 may not be maintained. If, on the other hand, packet flow 102 is not offloaded to processing entity 130, packet flow 102 will be processed by firewall 135. Firewall 135 may store complete flow state information for packet flow 102, and may also apply software-based security polices to packet flow 102. But, when sent to firewall 135, packet flow 102 may be hashed to ingress queues that are shared with other packet flows. High throughput packet flow 102 will affect the other flows, which may result in dropped packets. Similarly, processing flows at firewall 135 utilizes higher processing resources (i.e., a higher "CPU burden"), and results in lower throughput and higher latency.

According to the techniques presented herein, the classifier 125 is configured to offload packet flow 102 between processing entity 130 and firewall 135 such that a first subset of packets 102a is processed by processing entity 130 and a second subset of packets 102b is processed by firewall 135. By selectively offloading the packets between processing entity 130 and firewall 135, packet flow 102 may be efficiently processed while having its flow state maintained, while having security policies applied to it, and allowing packet flow 102 to be un-offloaded (i.e., handled completely by firewall 135) in the event certain conditions are met. Accordingly, packet flow 102 may be efficiently processed without affecting the performance of other packet flows and the processing may benefit from high processing throughput and lower latency.

Specifically, packet subset 102b may include control packets and other packets that meet certain criteria that indicate that the packets should be processed by firewall 135. As used herein, a "control packet" is a packet that indicates a potential change in a flow state of a packet flow. Non-limiting examples of the criteria that will be used to categorize packets into packet subset 102b will be described in more detail below with reference to FIGS. 2A, 2B and 5. Packet subset 102a may include normal packets or non-control packets (i.e., packets which are not control packets and which do not meet other criteria) and therefore, packet subset 102a may be processed by processing entity 130.

Figure 2A:
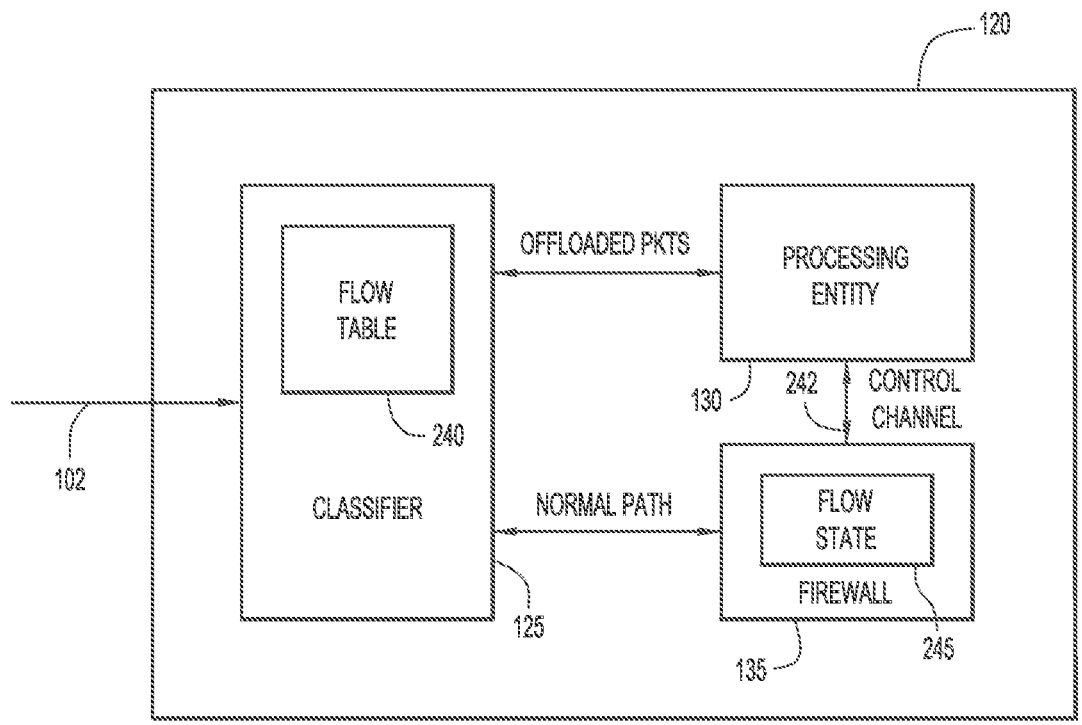
FIG. 2A illustrates a first security device configured to perform selective offloading of packet flows with flow state management, according to an example embodiment.

With reference now made to FIG. 2A, the operation of security device 120 will be described in detail. As used herein, security device 120 refers to one or more physical devices that are configured to apply security polices to network traffic. According to some example embodiments, security device 120 may be a single physical device that contains classifier 125, processing entity 130 and firewall 135. According to other example embodiments, one or more of classifier 125, processing entity 130 and firewall 135 are physically separate from each other. Thus, the classifier 125 may be embodied as a classifying network device and the firewall 135 may be embodied as a firewall network device that is physically separate from the classifying network device 125. The processing entity 130 may be a hardware entity that is physically separate from the classifying network device 125 and firewall network device 135.

As illustrated in FIG. 2A, when a packet of packet flow 102 (e.g., a high throughput or "fat" packet flow) is received at classifier 125, classifier 125 may be the first network device/function that receives the packet flow upon ingress from an external network, such as network 115 of FIG. 1. Accordingly, classifier 125 may be embodied as a network interface card (NIC), a switch, or another edge network device. Classifier 125 will compare the contents of the packet, such as the content of the packet header, to a flow table 240 to determine if the packet belongs to a flow that has already been analyzed and received an offload determination (i.e., has the packet flow already been determined to have been offloaded or not). Flow table 240 may contain data identifying packet flows that have received an offload decision. For example, flow table 240 may contain data indicating a tuple, such as a 5-tuple (e.g., a combination of a source IP address, a source port, a destination IP address, a destination port and the protocol utilized by the flow), that identifies flows that have received an offload decision. If classifier 125 determines that packet flow 102 has not received an offload decision (e.g., there is no entry in flow table 240 corresponding to the 5-tuple associated with packet flow 102), the packet of packet flow 102 is sent to firewall 135.

Firewall 135 operates on the dataplane, which allows it to implement software-based security policies and to apply substantive examination of packets, including deep packet inspection. When the packet of packet flow 102 is received at firewall 135 the packet is examined by firewall 135 to determine whether or not it should be offloaded. Firewall 135 may make its offload decision based on a number of factors, including static polices and/or more dynamic policies such as Access Control Lists (ACLs), policies based upon the throughput of the flow, Intrusion Prevention System (IPS) decisions, network behavioral analysis, the application identity associated with a flow, changes in endpoint reputation or posture, and others.

If the decision is made to offload packet flow 102, firewall 135 provides rewrite data to processing entity (e.g., offload engine) 130 via control channel 242. Data is also provided to classifier 125 that allows classifier 125 to update flow table 240 with data indicating packet flow 102 has been offloaded. Similar data may be sent to classifier 125 for flows which have been determined as not being offloaded. Specifically, firewall 135 may provide classifier 125 with data indicative of a 5-tuple for packet flow 102. Classifier 125 may then use this data to create an entry in flow table 240 for packet flow 102. Firewall 135 will also maintain a flow state for packet flow 102. Accordingly, firewall 135 may maintain data 245 that stores a flow state for packet flow 102. If packet flow 102 is a Transmission Control Protocol (TCP) packet flow, the offload decision made by firewall 135 may be made after a TCP handshake has been established for packet flow 102, allowing firewall 135 to maintain a flow state for packet flow 102.

Once the decision to offload packet flow 102 has been made, firewall 135 will communicate its decision to classifier 125, and flow table 240 may be updated to include data indicating the 5-tuple for packet flow 102. When subsequent packets are received at classifier 125, the 5-tuple of the received packets will be compared with the data contained in flow table 240. If the 5-tuple for the packets matches the 5-tuple for packet flow 102, classifier 125 determines that the packet belongs to offloaded packet flow 102. In general, packets belonging to packet flow 102 received at classifier 125 after the decision to offload packet flow 102 has been made will be sent to processing element 130. Accordingly, processing entity 130 serves as an offload engine for the offloaded packet flows. Processing entity 130 receives offloaded packets and applies operations to the packets based upon information received through control channel 242 from firewall 135. For example, processing entity 130 may receive "offset-size-rewrite data" from firewall 135 to be applied to packets received at processing entity 130. This data allows offload engine to provide Network Address Translation (NAT) and/or Port Address Translation (PAT) flows with IP address and TCP rewrite operations, allows processing entity 130 to randomize the sequence numbers of the received packets, and allows for the rewriting of Media Access Control (MAC) addresses and Virtual Local Area Network (VLAN) addresses. Furthermore, processing entity 130 may provide accounting information (i.e., number of packets, number of bytes, etc.) to firewall 135 via control channel 242 that may be correlated or combined with the flow state information maintained at firewall 135 via flow state data 245.

According to the example embodiment of FIG. 2A, not all packets of packet flow 102 will be offloaded to processing entity 130. Instead, classifier 125 is configured to selectively offload some packets of packet flow 102 to processing entity 130, while certain predetermined packets are sent to firewall device 135. These predetermined packets may include packets that include a control flag, such as a TCP control flag as illustrated below in FIG. 3. Because control packets are sent to firewall 135, firewall 135 may handle flow termination processes. The predetermined packets may also include fragment packets that may require processing at the firewall device 135 that processing entity 130 is not configured to perform. Internet Control Message Protocol (ICMP) packets may also be one of the predetermined type of packets that are always directed to firewall 135.

Other predetermined packet types may include packets that include TCP/IP options in the option field of the TCP/IP packet, as will be described in more detail below with reference to FIG. 3. Though, some standard TCP/IP options, such as the timestamp option, may be handled by processing entity 130. Accordingly, an indication of which options may be handled by processing entity 130 and which options require handling by firewall 135 may be determined by firewall 135 when the decision whether or not to offload a packet flow is being made. An indication of the options to be handled by processing entity 130 and/or firewall 135 may be sent to classifier 125 and included in flow table 240. With the option information included in flow table 240, classifier 125 may include option considerations when determining whether or not subsequent packets should be sent to processing entity 130 or firewall 135, as will be discussed in greater detail with reference to FIG. 5. Furthermore, the determination as to whether or not options are included in the packet may be based on the size of a packet header. The options field of the header is of variable length, as will be described in greater detail below with reference to FIG. 3. Accordingly, if the size of the packet header exceeds a predetermined size (e.g., the size of a header with no options indicated, or the size of a header with only certain options selected, such as the timestamp option), it may be determined that the packet should handled by firewall 135. On the other hand, if the size of the header is below a predetermined size, it may be determined that the packet should be handled by processing entity 130. Therefore, the classification provided by classifier 125 may take into account TCP/IP options, while doing so in a way that allows fast and/or efficient classification (i.e., without detailed inspection of the content of the option field of packets).

Because firewall 135 maintains the flow state for packet flow 102, firewall 135 may continue to gather information (e.g., statistics for packet flow 102) and provide timeout and clean-up logic for "dead" flows. Specifically, control channel 242 allows processing entity 130 to provide information regarding packet flow 102 to firewall 135 through data sent via control channel 242. Furthermore, because the flow state is maintained at firewall 135, firewall 135 may un-offload packet flow 102, thereby causing all subsequent packets to be processed at firewall 135. The determination to un-offload packet flow 102 may be made in response to control packets received at firewall 135 from classifier 125, in response to data received over control channel 242 from processing entity 130, or other considerations. For example, if a large number of packets of packet flow 102 include a TCP/IP option that causes the packets to be sent to firewall 135, firewall 135 may un-offload the entire packet flow for processing at firewall 135.

The un-offload decision may also be made in response to a pattern of bytes in the control packet, a reputation change of a source device of the control device, a posture change of the source device of the control packet, and/or timing of receipt of the control packet. For example, if a pattern of bytes in the control packet indicates that the control packet and/or packet flow 102 contains malicious data, the decision may be made to un-offload the packet flow. Furthermore, processing entity 130 may be configured to identify predetermined patterns of bytes in the packets sent to processing entity 130. The presence of these predetermined patterns of bytes may be communicated to firewall 135 through control channel 242.

As a further example, a change in posture of a flow may refer to a change in a flow that causes the packets sent as part of the flow to change from a pattern or posture that is consistent with a trusted packet flow to a pattern or posture of an untrusted packet flow. Specifically, the classifier 125 and/or processing entity 130 may report byte and packet counts in each direction of packet flow 102 to the main firewall 135. Firewall 135 may make observations and inferences regarding whether packet flow 102 conforms to a typical "trusted" pattern or not. Therefore, it may not be necessary to detect any specific byte sequence in control packets; the pattern of data traffic in the offload path may influence a decision to discontinue the offload of packet flow 102.

Reputation changes may also result in the un-offloading of packet flow 102. Reputation changes may be communicated to firewall 135 from, for example, a cloud intelligent service. The reputation may be communicated to firewall 135 as a numerical score. If the numerical score surpasses a predetermined threshold, firewall 135 may determine that the endpoint associated with the reputation value is malicious. Accordingly, flows associated with the malicious endpoint may be un-offloaded. As a further example, if the posture for a particular packet flow changes, and that flow is associated with a particular endpoint, this posture change may represent a reputation change for the endpoint associated with the packet flow. Accordingly, all flows from that endpoint may be un-offloaded in response to the posture change in one of the packet flows. A similar reputation change associated with an endpoint may result if an un-offloaded packet flow associated with the endpoint is examined and malicious data is found in the un-off-loaded packet flow. In response thereto, all offloaded flows from that endpoint may be un-offloaded in response to the detection made in the un-offloaded packet flow being inspected by the firewall.

These predetermined patterns of bytes, changes in reputation, changes in posture, and information regarding the time of receipt of packets may also be sent to firewall 135 so that the flow state for packet flow 102 may be updated even if the no change in the offload/un-offloading of packet flow 102 is made.

Firewall 135 may also be configured to temporarily un-offload packet flows of a predetermined length to ensure that the packet flow continues to conform with the reasons the initial offload decision was made. During the temporary un-offload, firewall 135 may inspect packets for a predetermined period of time to ensure that the previous offload decision remains appropriate for the packet flow. If the previous offload decision remains appropriate, firewall 135 may re-offload the packet flow.

Figure 2B:
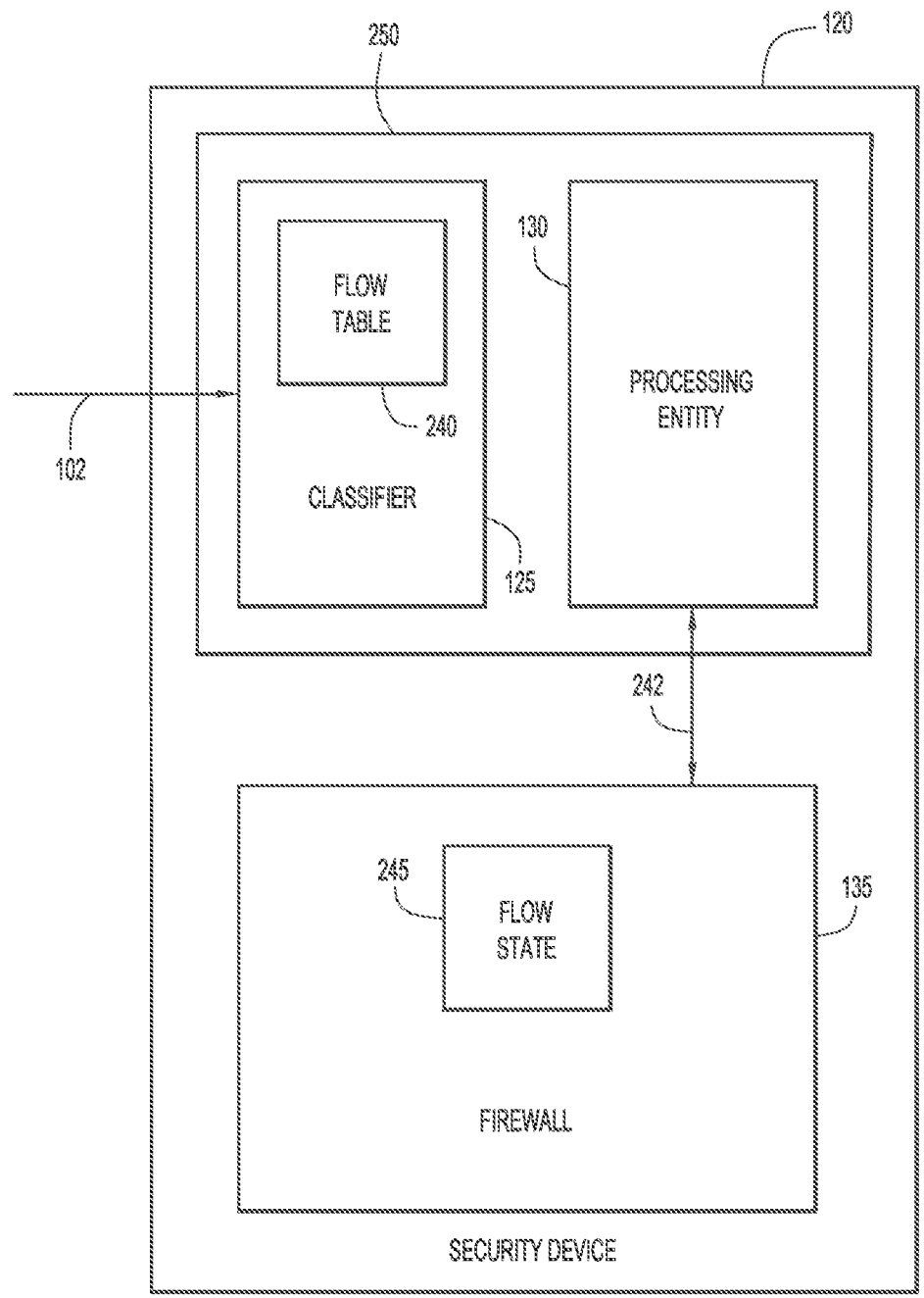
FIG. 2B illustrates a second security device configured to perform selective offloading of packet flows with flow state management, according to an example embodiment.

With reference now made to FIG. 2B, depicted therein is an additional example embodiment of a security device 120. The security device 120 of FIG. 2B is similar to that of FIGS. 1 and 2A, but differs in that classifier 125 and processing entity 130 are included in the same hardware/physical device 250. Accordingly, classifier 125 and processing entity 130 may share physical elements and functional elements, including the physical and functional elements illustrated below with reference to FIG. 6. For example, in some NICs, the network controller serves as the offload engine. Accordingly, in the example of FIG. 2B, the hardware/physical device 250 may be embodied as a NIC that carries out the operations associated with the classifier 125 and the processing entity (e.g., the offload engine) 130.

Figure 3:
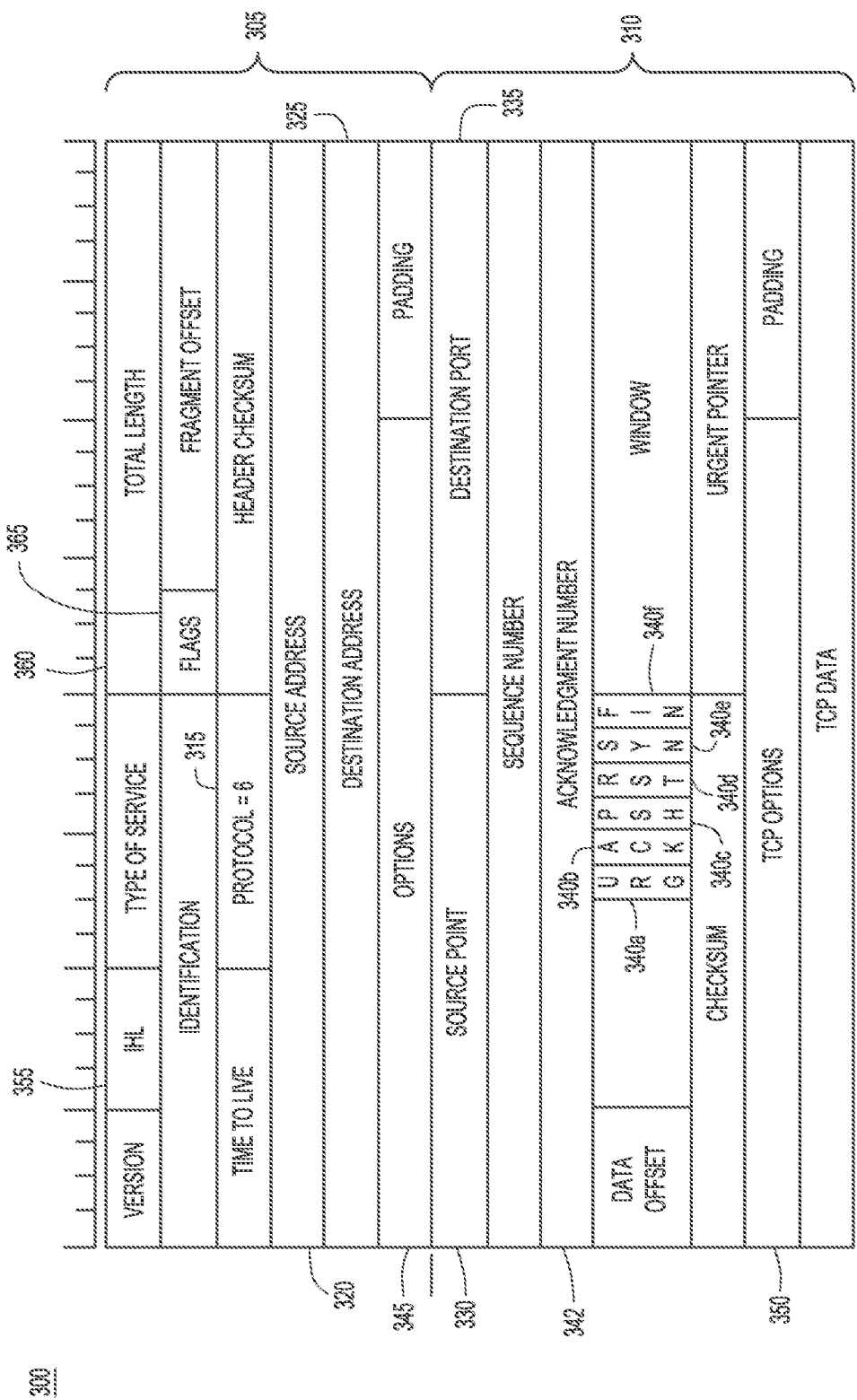
FIG. 3 illustrates a packet that is analyzed when performing selective offloading of packet flows with flow state management, according to an example embodiment.

With reference now made to FIG. 3, depicted therein is an example TCP packet 300 that may be offloaded from processing at a firewall device, such as firewall 135 of FIGS. 1, 2A and 2B, to a processing entity 130 of FIGS. 1, 2A and 2B. Packet 300 is illustrated to show the types of header fields that may be considered by firewall devices, classifiers and processing elements (e.g., offload engines) when making offload decisions, un-offload decisions, re-offload decisions, and classification decisions. While FIG. 3 illustrates an Internet Protocol version 4 (IPv4) packet, the techniques described herein may apply to other packet types, such as Internet Protocol version 6 (IPv6) packets Packet 300 includes an IP header portion 305 and a TCP header portion 310. Included in IP header is protocol field 315, source address 320 and destination address 325. Included in TCP header portion 310 are source port field 330 and destination port field 335. The combination of these five fields may be used to identify flows that have been offloaded. In other words, these five fields serve as the 5-tuple that may be stored in flow table 240 of FIGS. 2A and 2B. Included in TCP header portion 310 are control flags 340a-f. Urgent flag 340a indicates an urgent control packet. "ACK" control flag 340b, if set, indicates that acknowledgement number field 342 contains the next sequence number that the receiver device is expecting. "PSH" flag 340c indicates that the packet is a push control packet, "RST" flag 340d indicates that the packet is a reset packet, "SYN" flag 340e indicates that the packet is a synchronizing control packet, and "FIN" flag 340f indicates that the packet is the final packet in the packet flow. Other control flags not illustrated in FIG. 3 may also be included in packet 300, including a congestion window reduction control flag, an Explicit Congestion Notification (ECN) control flag, and an ECN echo control flag, among others.

As discussed above with reference to FIGS. 2A and 2B, control packets may be sent to a firewall device even when the decision has been made to offload a packet flow to a processing device (e.g., an offload engine). Some of control flags 340a-f may identify a packet as being a control packet, though only certain control flags may be sufficient and/or necessary to identify a packet as a control packet that should be sent to the firewall. For example, control flags that indicate a potential change in the flow state, e.g. RST flag 340d, SYN flag 340e, or FIN flag 340f, may indicate that a packet is a control packet that should be sent to the firewall device. Similarly, a combination of a control flag and additional information from the packet header and/or payload may serve to indicate that the packet is a control packet that should be sent to the firewall device.

Each of IP header portion 305 and TCP header portion 310 includes an option field, IP options field 345 and TCP option field 350, respectively. As discussed above, packets may be routed by a classifier to a firewall device or a processing element (e.g., an offload engine) based upon the specific options indicated in these fields. As already discussed, a timestamp option in the IP Option field 345 may be permissible for routing the packet to the processing element. A non-limiting list of options that may be included in the IP option field 345 includes:

End of Options List;
No Operation;
Security;
Loose Source Route;
Extended Security;
Commercial Security;
Record Route;
Stream ID;
Strict Source Route;
Experimental Measurement;
Maximum Transmission Unit Probe;
Maximum Transmission Unit Reply;
Experimental Flow Control;
Experimental Access Control;
IMI Traffic Descriptor;
Extended Internet Protocol;
Traceroute;
Address Extension;
Router Alert;
Selective Directed Broadcast;
Dynamic Packet State;
Upstream Multicast Packet;
Quick-Start; and
Experimental Options.

A non-limiting list of options that may be included in the TCP option field 350 includes:

End of Option List
No-Operation;
Maximum Segment Size;
Window Scale;
Selective Acknowledgment;
Selective Acknowledgment Permitted;
Echo;
Echo Reply;
Timestamps;
Partial Order Connection Permitted;
Partial Order Service Profile;
Connection Count
Connection Count ECHO;
TCP Alternate Checksum Request;
TCP Alternate Checksum Data;
Trailer Checksum Option;
Method Digest 5 Signature Option;
Space Communications Protocol Specifications Capabilities;
Selective Negative Acknowledgements;
Record Boundaries;
Corruption experienced;
Subnetwork Access Protocol;
TCP Compression Filter; \
Quick-Start Response;
User Timeout Option;
TCP Authentication Option; and
Multipath TCP.

Also included in packet 300 are IP header length field 355 and total length field 360. IP header length field 355 indicates the length of the IP header, while total length field 360 indicates the length of the packet. These fields may be used by a classifier, such as classifier 125 of FIGS. 1, 2A and 2B, to determine which packets of an offloaded packet flow should be sent to a processing element (e.g., an offload engine) and which should be sent to a firewall. For example, the length of the header indicated in IP header length field 355 or the length of the entire packet indicated in total length field 360 may determine whether or not a packet of an offloaded flow should be sent to a firewall device or a processing entity (e.g., offload engine). Furthermore, these fields may serve as an efficient way to determine if a packet contains options or is a fragment. For example, a header that includes options may be larger than a header without options. Therefore, header length field 355 may indicate whether or not a packet includes options. Additionally, the length of the packet header may indicate which options are indicated, allowing header length field 355 to serve as a differentiator between packets with different options indicated.

Finally, flags 365 may be used to identify fragmented packets. Flags within flag field 365 will indicate whether or not a packet is fragmented. Accordingly, based on flags field 365, a classifier may send a packet of an offloaded data flow to a firewall device if the packet is a fragmented packet, or to a processing element (e.g., an offload engine) if the packet is not fragmented.

Figure 4:
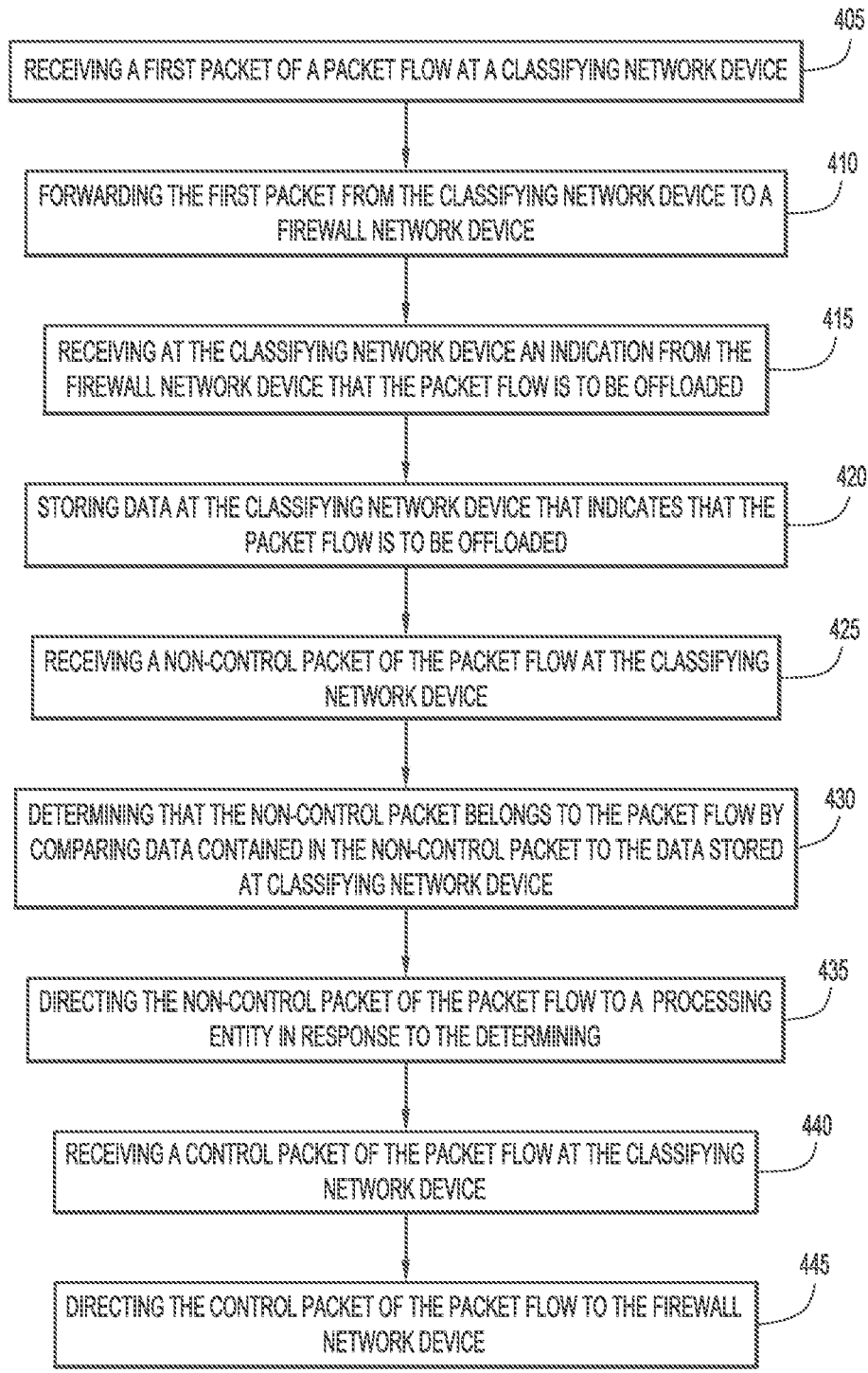
FIG. 4 is a flowchart illustrating a first method for performing selective offloading of packet flows with flow state management, according to an example embodiment.

With reference now made to FIG. 4, depicted therein is a flowchart 400 illustrating a process of performing selective packet flow offloading with state management. In operation 405, a first packet of a packet flow is received at a classifying network device, such as classifier device 125 of FIGS. 1, 2A and 2B. In operation 410, the first packet is forwarded from the classifying device to a firewall device, such as firewall device 135 of FIGS. 1, 2A and 2B. In operation 415, an indication is received at the classifying device from the firewall device indicating that the packet flow is to be offloaded. In other words, in example embodiments of operations 405-415, packets received at a classifying device are forwarded to a firewall device, and the firewall device may determine from the packet that the packet flow associated with the packet should be offloaded to a processing element. Accordingly, the firewall device sends an indication of this decision to the classifying network device.

In operation 420, data is stored in the classifying network device that indicates that the packet flow is to be offloaded. For example, a 5-tuple associated with the packet flow may be stored in a table, such as table 240 of FIGS. 2A and 2B. As described with reference to FIGS. 2A and 2B, the data may be used to determine how to treat subsequent packets received at a classifying network device (e.g., should the packets be treated as part of an offloaded flow).

In operation 425, a non-control packet of the packet flow is received at the classifying network device. The non-control packet may be a TCP packet whose control flags indicate that the packet is not serving a control function (e.g., the packet is not the type of packet that would indicate an up or down change in the flow state of the flow associated with the packet). In operation 430 it is determined that the non-control packet belongs to the packet flow by comparing the non-control packet to the data stored at the classifying network device. For example, a 5-tuple of the non-control packet may be compared to entries in a flow table to determine if the flow table contains an entry corresponding to the 5-tuple associated with the received non-control packet.

In operation 435 and in response to the determining, the non-control packet of the packet flow is directed to a processing entity. For example, if it is determined that the non-control packet is part of an offloaded packet flow in operation 430, operation 435 will direct the packet to a processing element (e.g., an offload engine) as opposed to directing the non-control packet to the firewall device, thereby offloading the packet from the firewall device and onto the processing element.

In operation 440, a control packet (e.g., the packet is the type of packet that would indicate an up or down change in the flow state of the flow associated with the packet) is received at that classifying network device. Finally, in operation 445, the control packet is directed to the firewall network device. In other words, and as illustrated through the difference between operations 435 and 445, flowchart 400 illustrates a process for selectively offloading packets of a packet flow. Through the process of flowchart 400, non-control packets may be offloaded to a processing element (e.g., an offload engine), while control packets (as well as other predetermined packets as described above) continue to be sent to the firewall device for application of software-based policies.

Figure 5:
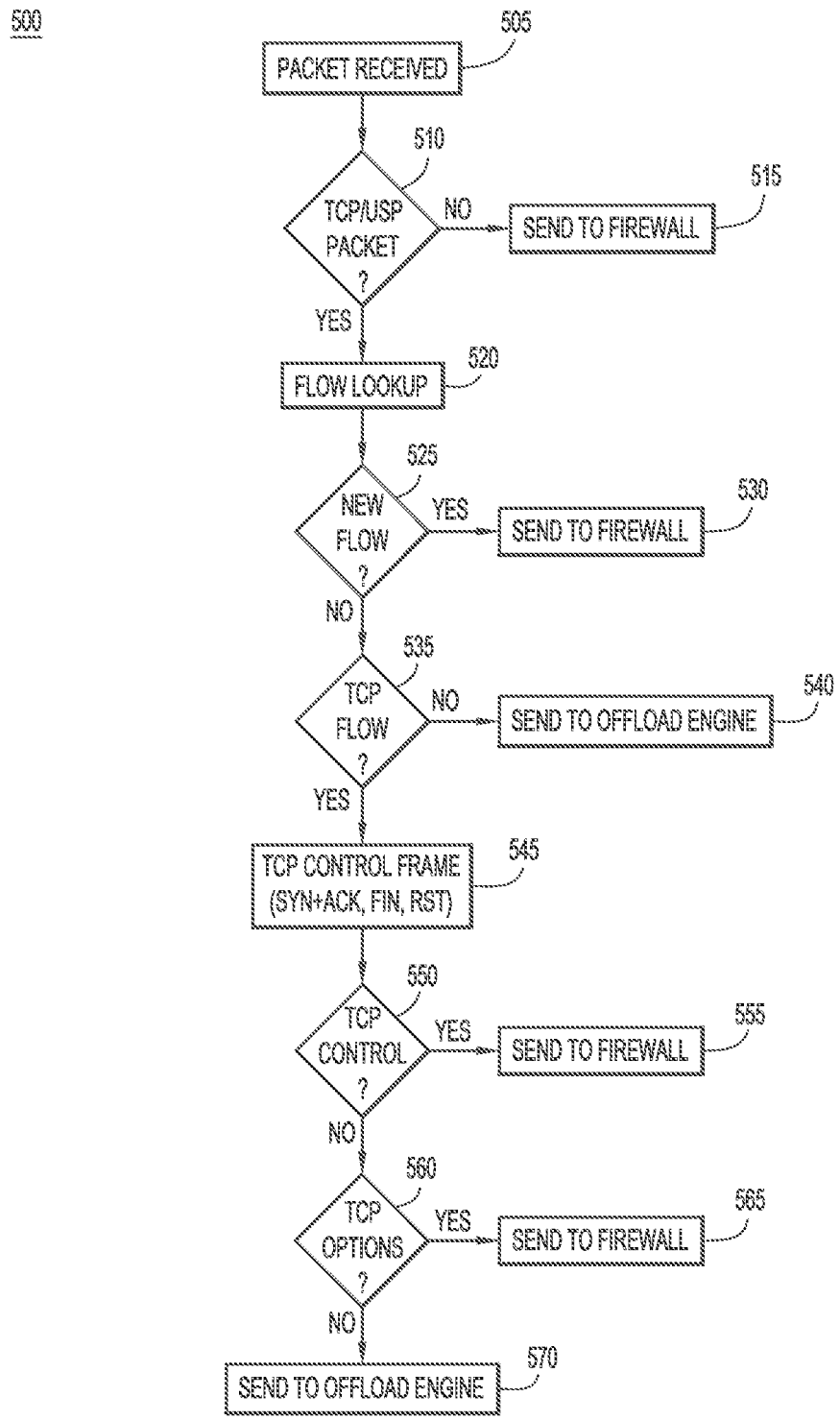
FIG. 5 is a flowchart illustrating a second method for performing selective offloading of packet flows with flow state management, according to an example embodiment.

With reference now made to FIG. 5, depicted therein is a flowchart 500 illustrating how individual packets are processed at a classifying network device, such as classifier device 125 of FIGS. 1, 2A and 2B. Flowchart 500 begins in operation 505 where a packet is received at a classifying network device, such as classifier device 125 of FIGS. 1, 2A and 2B. In operation 510, it is determined whether or not the packet is a TCP and/or a UDP packet. If the packet is not a TCP and/or UDP packet, operation 515 directs the packet to a firewall device, such as firewall device 135 of FIGS. 1, 2A and 2B. If the packet is a TCP and/or a UDP packet, the processing proceeds to operation 520 to allow the firewall device to make an offload determination for the packet flow of the packet.

In operation 520, data stored at the classifying network device is referenced. For example, a flow lookup may be performed on a flow table to determine if the received packet belongs to an offloaded packet flow. In operation 525 a determination is made whether or not the packet is from a new flow (i.e., a flow whose packets have not been previously received at the classifying network device). If the packet does belong to a new flow, the packet is forwarded to the firewall device in operation 530.

If the packet does not belong to a new flow, a determination is made in operation 535 whether or not the packet belongs to a TCP flow. According to the example embodiment of FIG. 5, all non-TCP flows (e.g., UDP flows) are offloaded. Therefore, if it is determined that the packet belongs to a non-TCP flow, the packet is directed to a processing element (e.g., an offload engine) in operation 540. Other example embodiments may treat non-TCP flows differently.

If the packet does belong to a TCP flow, the packet is analyzed in operation 545 to determine whether or not the packet is a control packet or if the packet contains certain predetermined options. In operation 550 it is determined whether or not the packet is a control packet. If the packet is a control packet, it is sent to a firewall device in operation 555. If the packet is not a control packet, a further determination is made in operation 560 to determine if the packet has options selected that require processing at a firewall device. If the packet contains such options, the packet is forwarded to the firewall device in operation 565. If the packet does not contain such options, processing of the packet completes by directing the packet to the processing element (e.g., the offload engine) in operation 570.

Figure 6:
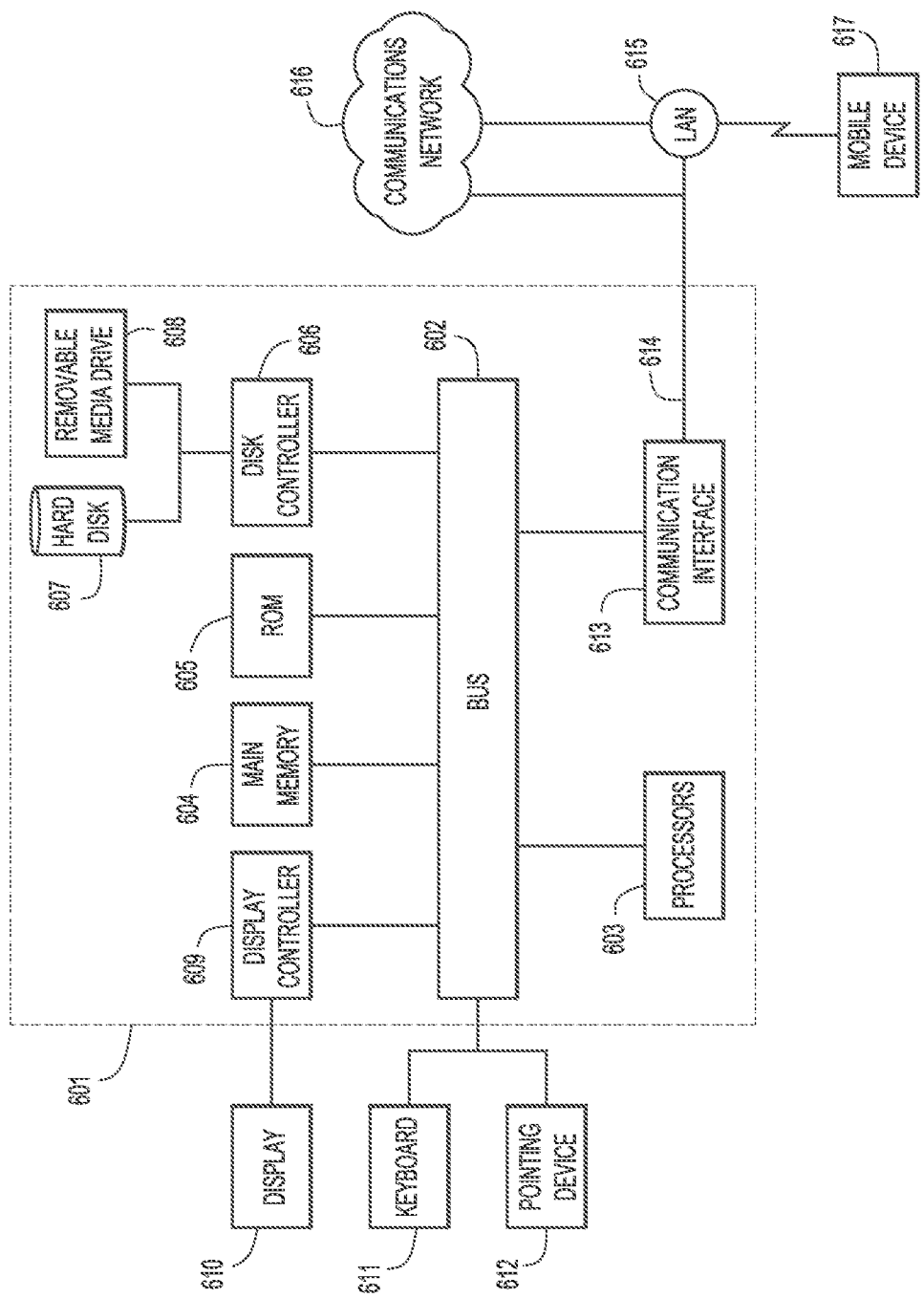
FIG. 6 is a block diagram of device configured to perform selective offloading of packet flows with flow state management, according to an example embodiment.

With reference made to FIG. 6, illustrated therein is a computer system 601 upon which the embodiments presented may be implemented. The computer system 601 may be programmed to implement a computer based device, executing one or more physical or virtual elements as depicted in FIGS. 1, 2A and 2B. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which may perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT) or a light emitting diode (LED) display, for displaying information to a computer user. The computer system 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. The pointing device 612 may also be incorporated into the display device as, for example, a capacitive touchscreen and/or a resistive touchscreen. In addition, a printer may provide printed listings of data stored and/or generated by the computer system 601.

The computer system 601 performs a portion or all of the processing steps of the described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer may read.

Stored on any one or on a combination of non-transitory computer readable storage media, embodiments presented herein include software for controlling the computer system 601, for driving a device or devices for implementing the processes described herein, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local are network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system

601 may transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

In summary, provided for herein are methods, apparatuses and computer readable media configured to provide selective offloading of packet flows with flow state management. The offloading may be accomplished after analysis by a firewall device, and after, for example, completion of a TCP handshake for the flow. As described herein, a firewall device will maintain the flow state for the flow and a processing element (e.g., an offload engine) will perform rewrite operations on offloaded packets. Control packets (e.g., packets indicating an up or down change in the flow state for the packet flow) may be processed by the firewall device and other packets may be processed by the processing element (e.g., the offload engine). The processing element may be programmed with a simple classifier which allows the hardware device to send control packets of the flow to the firewall device. Accordingly to other example embodiments, the classifier may be embodied in a device separate from that of both the firewall device and the processing element.

Accordingly, provided for herein are methods in which a first packet of a packet flow is received at a classifying network device. The first packet is forwarded from the classifying network device to a firewall network device. An indication that the packet flow is to be offloaded is received at the classifying network device from the firewall network device. Data is stored at the classifying network device that indicates that the packet flow is to be offloaded. A non-control packet of the packet flow is received at the classifying network device. A determination is made that the non-control packet belongs to the packet flow by comparing data contained in the non-control packet to the data stored at classifying network device. The non-control packet of the packet flow is directed to a processing entity in response to the determining. A control packet of the packet flow is received at the classifying network device. The control packet of the packet flow is directed to the firewall network device.

Also provided for herein is an apparatus comprising a memory, a network interface unit configured to enable network communications and one or more processors. The processor is configured to receive, via the network interface unit, a first packet of a packet flow. The first packet is forwarded by the processor from the network interface unit to a firewall network device. An indication that the packet flow is to be offloaded is received by the processor via the network interface unit from the firewall network device. The processor is configured to store data in the memory that indicates that the packet flow is to be offloaded. The processor is configured to receive a non-control packet of the packet flow via the network interface unit. The processor is also configured to determine that the non-control packet belongs to the packet flow by comparing data contained in the non-control packet to the data stored in the memory. The processor is configured to direct the non-control packet of the packet flow to a processing entity in response to the determining. The processor is further configured to receive a control packet of the packet flow via the network interface unit. The processor is configured such that the control packet of the packet flow is directed to the firewall network device.

In addition to the method and apparatus, also provided for herein is a non-transitory computer readable storage media encoded with instructions. When executed, the instructions are operable to receive a first packet of a packet flow at a classifying network device. The instructions are further operable to forward the first packet from the classifying network device to a firewall network device. In response to the execution of the instructions, an indication that the packet flow is to be offloaded is received at the classifying network device from the firewall network device. The instructions, when executed, cause data to be stored at the classifying network device that indicates that the packet flow is to be offloaded. The instructions are further operable to receive a non-control packet of the packet flow at the classifying network device. The execution of the instructions causes a determination to be made that the non-control packet belongs to the packet flow by comparing data contained in the non-control packet to the data stored at classifying network device. The execution of the instructions causes the non-control packet of the packet flow to be directed to a processing entity in response to the determining. The execution of the instructions also causes a control packet of the packet flow to be received at the classifying network device. Finally, execution of the instructions causes the control packet of the packet flow to be directed to the firewall network device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving a first packet of a packet flow at a classifying network device;
   forwarding the first packet from the classifying network device to a firewall network device;
   receiving at the classifying network device an indication from the firewall network device that non-control packets of the packet flow are to be offloaded to a processing entity, wherein control packets of the packet flow are to be directed to the firewall network device;
   storing, at the classifying network device, data that indicates that the packet flow is to be offloaded;
   receiving one or more non-control packets of the packet flow at the classifying network device;
   determining that the one or more non-control packets belong to the packet flow by comparing data contained in the one or more non-control packets to the data stored at the classifying network device;
   directing the one or more non-control packets of the packet flow to the processing entity in response to the determining the one or more non-control packets belong to the packet flow;
   receiving a packet of the packet flow at the classifying network device indicating a possible change in a flow state of the packet flow;
   determining that the packet belongs to the packet flow by comparing data contained in the packet to the data stored at the classifying network device;
   determining that the packet of the packet flow is a type that is to be forwarded to the firewall network device;
   directing the packet of the packet flow to the firewall network device, in response to the determining the packet of the packet flow is of the type that is to be forwarded to the firewall network device, to maintain the flow state of the packet flow at the firewall network device;
receiving, at the classifying network device in response to predetermined criteria evaluated by the firewall network device, an indication from the firewall network device that the packet flow should no longer be directed to the processing entity, wherein the predetermined criteria comprise a pattern of bytes from one or more control packets of the packet flow, a reputation change of a source device of the packet flow, a posture change of the source device of the packet flow, and timing of receipt of the packet flow;
receiving a non-control packet of the packet flow at the classifying network device; and
directing the non-control packet of the packet flow to the firewall network device.

2. The method of claim 1, wherein:
the firewall network device applies services to the first packet via software instructions stored at the firewall network device; and
the processing entity applies services to the one or more non-control packets via hardware of the processing entity.

3. The method of claim 2, wherein the hardware executes packet rewrite instructions.

4. The method of claim 1, further comprising storing data maintaining a flow state of the packet flow at the firewall network device.

5. The method of claim 4, further comprising sending, from the classifying network device, data to the firewall network device to define and/or update the flow state of the packet flow.

6. The method of claim 1, further comprising:
receiving a non-control packet of the packet flow at the classifying network device;
determining at the classifying network device that an amount of data contained in the non-control packet exceeds a predetermined threshold; and
directing the non-control packet to the firewall network device in response to determining that the amount of data contained in the non-control packet exceeds the predetermined threshold.

7. The method of claim 6, wherein the amount of data contained in the non-control packet that exceeds the predetermined threshold comprises header data of the non-control packet.

8. The method of claim 1, wherein the data that indicates that the packet flow is to be offloaded comprises data indicating a 5-tuple of the packet flow.

9. The method of claim 1, wherein:
the data that indicates that the packet flow is to be offloaded is stored in a table; and
determining that the one or more non-control packets belong to the packet flow comprises performing a look-up in the table.

10. The method of claim 1, wherein:
the packet flow comprises a Transmission Control Protocol (TCP) packet;
the first packet comprises a packet sent as part of a TCP handshake for the packet flow; and
the packet and the one or more non-control packets comprise packets of the packet flow received at the classifying network device after completion of the TCP handshake for the packet flow.

11. The method of claim 1, wherein receiving the one or more non-control packets of the packet flow at the classifying network device comprises receiving a packet comprising control flag fields, wherein the control flag fields indicate that the packet is not a control packet.

12. The method of claim 1, wherein the processing entity comprises an offload engine.

13. An apparatus comprising:
a memory;
a network interface unit configured to enable network communications; and
a processor, wherein the processor is configured to:
receive, via the network interface unit, a first packet of a packet flow;
forward, via the network interface unit, the first packet to a firewall network device;
receive, via the network interface unit, an indication from the firewall network device that non-control packets of the packet flow are to be offloaded to a processing entity, wherein control packets of the packet flow are to be directed to the firewall network device;
store, in the memory, data that indicates that the packet flow is to be offloaded;
receive, via the network interface unit, one or more non-control packets of the packet flow;
determine that the one or more non-control packets belong to the packet flow by comparing data contained in the one or more non-control packets to the data stored in the memory;
direct the one or more non-control packets of the packet flow to the processing entity in response to determining that the one or more non-control packets belong to the packet flow;
receive, via the network interface unit, a packet of the packet flow indicating a possible change in a flow state of the packet flow;
determine that the packet belongs to the packet flow by comparing data contained in the packet to the data stored in the memory;
determine that the packet of the packet flow is a type that is to be forwarded to the firewall network device;
direct the packet of the packet flow to the firewall network device, in response to determining the packet of the packet flow is of the type that is to be forwarded to the firewall network device, to maintain the flow state of the packet flow at the firewall network device;
receive, via the network interface unit in response to predetermined criteria evaluated by the firewall network device, an indication from the firewall network device that the packet flow should no longer be directed to the processing entity, wherein the predetermined criteria comprise a pattern of bytes from one or more control packets of the packet flow, a reputation change of a source device of the packet flow, a posture change of the source device of the packet flow, and timing of receipt of the packet flow;
receive, via the network interface unit, a non-control packet of the packet flow; and
direct the non-control packet of the packet flow to the firewall network device.

14. The apparatus of claim 13, wherein the data stored in the memory that indicates that the packet flow is to be offloaded comprises data indicating a 5-tuple of the packet flow.

15. A tangible non-transitory computer readable medium containing instructions, wherein the instructions, when executed, cause a processor to:
- receive a first packet of a packet flow at a classifying network device;
- forward the first packet from the classifying network device to a firewall network device;
- receive at the classifying network device an indication from the firewall network device that non-control packets the packet flow are to be offloaded to a processing entity, wherein control packets of the packet flow are to be directed to the firewall network device;
- store, at the classifying network device, data that indicates that the packet flow is to be offloaded;
- receive one or more non-control packets of the packet flow at the classifying network device;
- determine that the one or more non-control packets belong to the packet flow by comparing data contained in the one or more non-control packets to the data stored at the classifying network device;
- direct the one or more non-control packets of the packet flow to the processing entity in response to determining that the one or more non-control packets belong to the packet flow;
- receive a packet of the packet flow at the classifying network device indicating a possible change in a flow state of the packet flow;
- determine that the packet belongs to the packet flow by comparing data contained in the packet to the data stored at the classifying network device;
- determine that the packet of the packet flow is a type that is to be forwarded to the firewall network device;
- direct the packet of the packet flow to the firewall network device, in response to determining the packet of the packet flow is of the type that is to be forwarded to the firewall network device, to maintain the flow state of the packet flow at the firewall network device;
- receive, at the classifying network device in response to predetermined criteria evaluated by the firewall network device, an indication from the firewall network device that the packet flow should no longer be directed to the processing entity, wherein the predetermined criteria comprise a pattern of bytes from one or more control packets of the packet flow, a reputation change of a source device of the packet flow, a posture change of the source device of the packet flow, and timing of receipt of the packet flow;
- receive a non-control packet of the packet flow at the classifying network device; and
- direct the non-control packet of the packet flow to the firewall network device.

16. The tangible non-transitory computer readable medium of claim 15, wherein the instructions that cause the processor to store, at the classifying network device, data that indicates that the packet flow is to be offloaded further comprise instructions that cause the processor to store data indicating a 5-tuple of the packet flow.

17. The method of claim 1, further comprising:
- receiving at the classifying network device an indication from the firewall network device that non-control Transmission Control Protocol (TCP) packets comprising a predetermined option are to be offloaded to the processing entity;
- receiving a second packet of the packet flow at the classifying network device, wherein the second packet of the packet flow comprises a Transmission Control Protocol (TCP) packet;
- determining at the classifying network device that the TCP packet of the packet flow is not a control packet of the packet flow;
- determining whether the TCP packet of the packet flow includes the predetermined option;
- if the TCP packet of the packet flow is determined to include the predetermined option, then directing the TCP packet of the packet flow to the firewall network device; and
- if the TCP packet is determined not to include the predetermined option, then directing the TCP packet of the packet flow to the processing entity.

18. The apparatus of claim 13, wherein the processor is further configured to:
- receive, via the network interface unit, an indication from the firewall network device that non-control Transmission Control Protocol (TCP) packets comprising a predetermined option are to be offloaded to the processing entity;
- receive, via the network interface unit, a second packet of the packet flow, wherein the second packet of the packet flow comprises a Transmission Control Protocol (TCP) packet;
- determine that the TCP packet of the packet flow is not a control packet of the packet flow;
- determine whether the TCP packet of the packet flow includes the predetermined option;
- if the TCP packet of the packet flow is determined to include the predetermined option, then direct the TCP packet of the packet flow to the firewall network device; and
- if the TCP packet is determined not to include the predetermined option, then direct the TCP packet of the packet flow to the processing entity.

19. The tangible non-transitory computer readable medium of claim 15, wherein the instructions further cause the processor to:
- receive at the classifying network device an indication from the firewall network device that non-control Transmission Control Protocol (TCP) packets comprising a predetermined option are to be offloaded to the processing entity;
- receive a second packet of the packet flow at the classifying network device, wherein the second packet of the packet flow comprises a Transmission Control Protocol (TCP) packet;
- determine at the classifying network device that the TCP packet of the packet flow is not a control packet of the packet flow;
- determine whether the TCP packet of the packet flow includes the predetermined option;
- if the TCP packet of the packet flow is determined to include the predetermined option, then direct the TCP packet of the packet flow to the firewall network device; and
- if the TCP packet is determined not to include the predetermined option, then direct the TCP packet of the packet flow to the processing entity.

20. The apparatus of claim 13, wherein:
- the firewall network device applies services to the first packet via software instructions stored at the firewall network device; and
- the processing entity applies services to the one or more non-control packets via hardware of the processing entity.

21. The apparatus of claim 20, wherein the hardware executes packet rewrite instructions.

22. The tangible non-transitory computer readable medium of claim 15, wherein:
- the firewall network device applies services to the first packet via software instructions stored at the firewall network device; and
- the processing entity applies services to the one or more non-control packets via hardware of the processing entity.

23. The tangible non-transitory computer readable medium of claim 22, wherein the hardware executes packet rewrite instructions.

* * * * *